United States Patent
Norlie et al.

[11] 3,898,935
[45] Aug. 12, 1975

[54] CAR TURNER

[75] Inventors: Bruce Norlie, Durham; Bernard G. Bradbury, Chico, both of Calif.

[73] Assignee: Rexnord Inc., Milwaukee, Wis.

[22] Filed: Jan. 28, 1974

[21] Appl. No.: 437,082

[52] U.S. Cl. .................... 104/37; 104/44; 104/47
[51] Int. Cl. ............................................ B60s 13/02
[58] Field of Search .............................. 104/35–47, 104/88, 249–253, 257–260; 105/28

[56] References Cited
UNITED STATES PATENTS

| | | | |
|---|---|---|---|
| 1,087,424 | 2/1914 | Bauman | 104/44 X |
| 1,187,151 | 6/1916 | Johnson | 104/249 X |
| 2,157,404 | 5/1939 | Dodge et al. | 104/44 |
| 2,244,598 | 6/1941 | Ash | 104/44 |
| 2,987,008 | 6/1961 | Melmer | 104/36 |
| 3,060,865 | 10/1962 | Piotrowski | 104/38 X |
| 3,081,713 | 3/1963 | Perkins | 104/250 |
| 3,185,109 | 5/1965 | Mengel | 104/45 |

FOREIGN PATENTS OR APPLICATIONS
872,489  7/1961  United Kingdom ............... 104/38

Primary Examiner—M. Henson Wood, Jr.
Assistant Examiner—Andres Kashnikow
Attorney, Agent, or Firm—Sughrue, Rothwell, Mion, Zinn and Macpeak

[57] ABSTRACT

A car turner for the cars of a unit transportation system in which a turntable is rotatable by means of at least one sprocket integrally mounted on its pivot shaft, at least one sprocket rotatably mounted on a stationary frame, a chain passing around both sprockets, and a dual-action fluid cylinder mounted on the stationary frame and connected to the chain so that it is driven in one way when the cylinder extends and the other way when it contracts. Preferably, two pairs of sprockets and a double chain are used. Means for releasably retaining a car on the turntable during the rotary motion may be provided.

10 Claims, 8 Drawing Figures

PATENTED AUG 12 1975 3,898,935
SHEET 1
FIG. 1
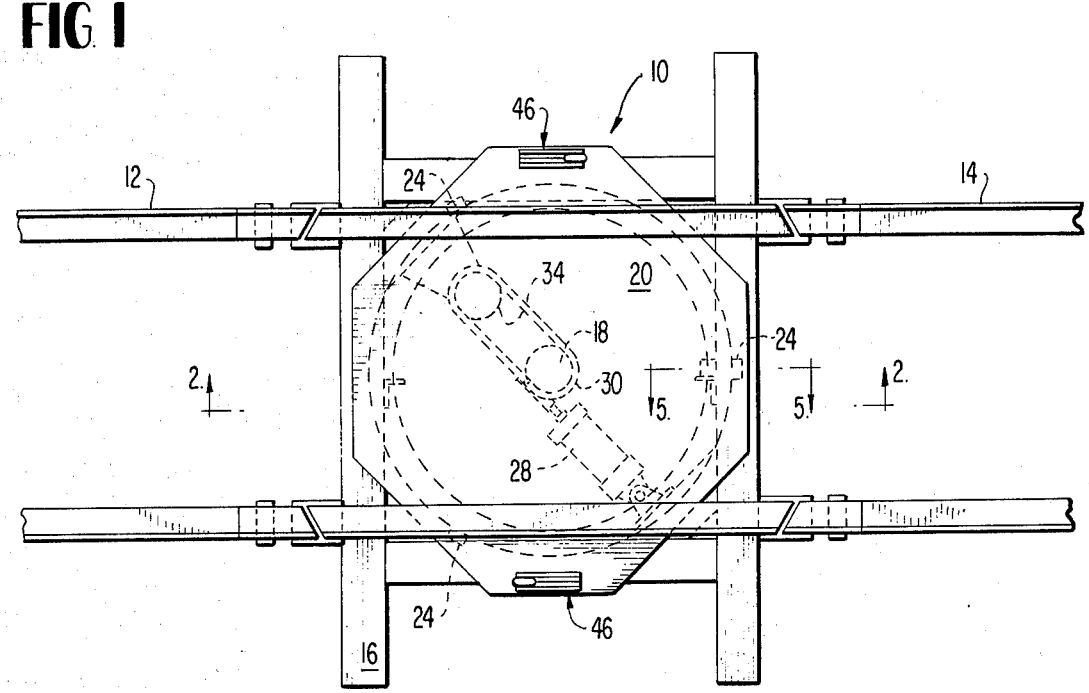
FIG. 2
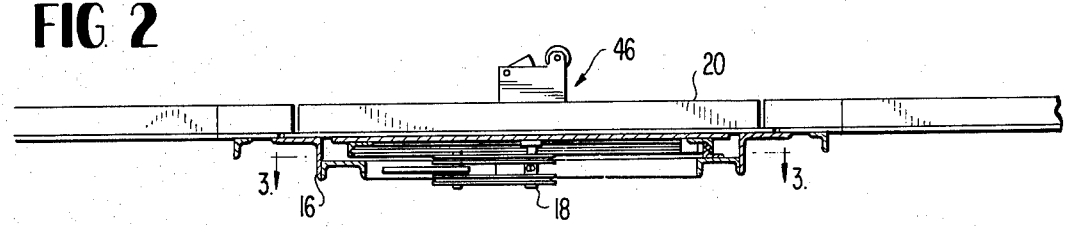
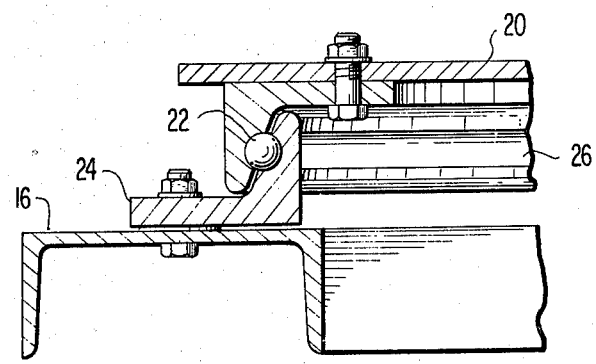
FIG. 5

CAR TURNER

FIELD OF THE INVENTION

This invention relates generally to car turners for a unit carrier system and, more specifically, to car turners suitable for use with a unit carrier system such as is disclosed in commonly assigned U.S. Pat. Nos. 3,613,916, 3,621,790, 3,626,859, and 3,650,216.

BACKGROUND OF THE INVENTION

In a unit carrier system such as is disclosed in the above patents, it is often desirable to rotate a car by a predetermined angle (commonly 90° or 180°) while the car is located in one spot. Particularly for a system subjected to heavy traffic, the means to accomplish the above result must be fast, extremely reliable, and easy to repair if anything does go wrong. The invention disclosed herein was developed with those considerations in mind, and it is in fact capable of quickly and reliably rotating the cars of a unit carrier system by any desired angle, yet is is very easy to repair if it malfunctions.

SUMMARY OF THE INVENTION

The present invention employs a turntable rotatable by means of at least one sprocket integrally mounted on its pivot shaft, at least one sprocket rotatably mounted on a stationary frame, a chain passing around both sprockets, and a dual-action fluid cylinder mounted on the stationary frame and connected to the chain so that it is driven in one way when the cylinder extends and other way when it contracts. Preferably, two pairs of sprockets and a double chain are used. Means for releasably retaining a car on the turntable during the rotary motion may be provided.

BRIEF DESCRIPTION OF THE DRAWINGS

FIG. 1 is a top plan view of a car turner embodying the present invention.

FIG. 2 is a sectional view taken along the lines 2—2 in FIG. 1.

FIG. 5 is a sectional view taken along the lines 5—5 in FIG. 1.

DETAILED DESCRIPTION OF THE PREFERRED EMBODIMENT

Figure 3:
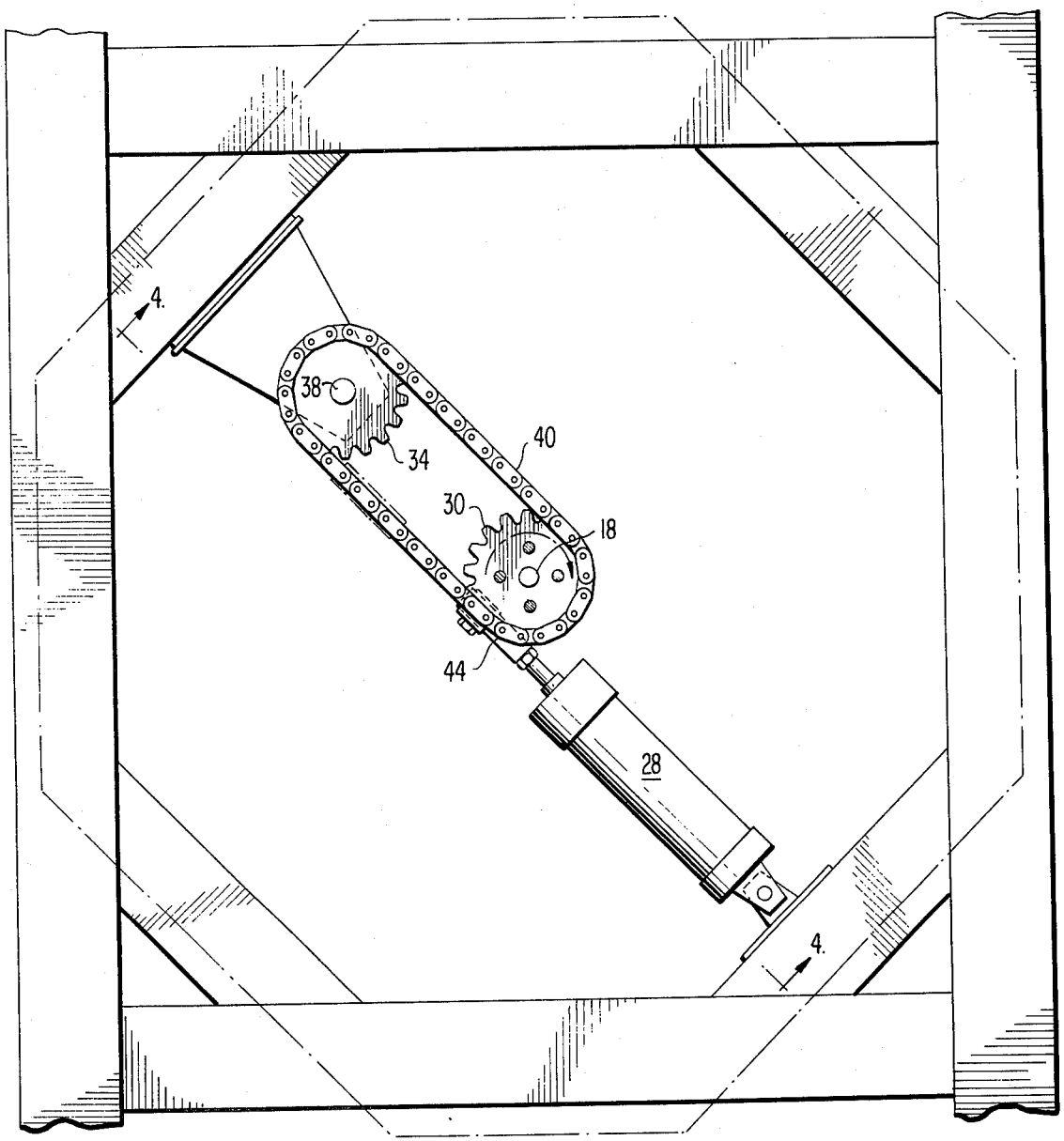
FIG. 3 is a sectional view taken along the lines 3—3 in FIG. 2.

The illustrated preferred embodiment is designed to rotate a car by 180°, thereby completely reversing its direction. It will be apparent to those skilled in the art, however, that this embodiment could be readily modified to rotate a car by 90° or by any other desired amount, and such modifications are definitely to be considered within the scope of our invention.

FIGS. 1-5 show a car turner, indicated generally by the number 10, for rotating cars coming to and leaving the car turner 10 on either the tracks 12 or the tracks 14. The car turner 10 comprises a stationary frame 16, a rotatable pivot shaft 18 mounted on the stationary frame 16, and a turntable 20 mounted on the rotatable pivot shaft 18. To support the turntable 20, particularly when it is carrying a car to be turned by the car turner 10, it is also journalled near its periphery by a plurality of ball bearings 22, trapped in housings 24, one of which is illustrated in detail in FIG. 5. In the embodiment shown therein, the housing 24 is fixedly attached to the stationary frame 16, and the ball bearing 22 travels in a raceway 26 in the inner underside of the turntable 20, but obviously this relationship could be reversed.

Figure 6:
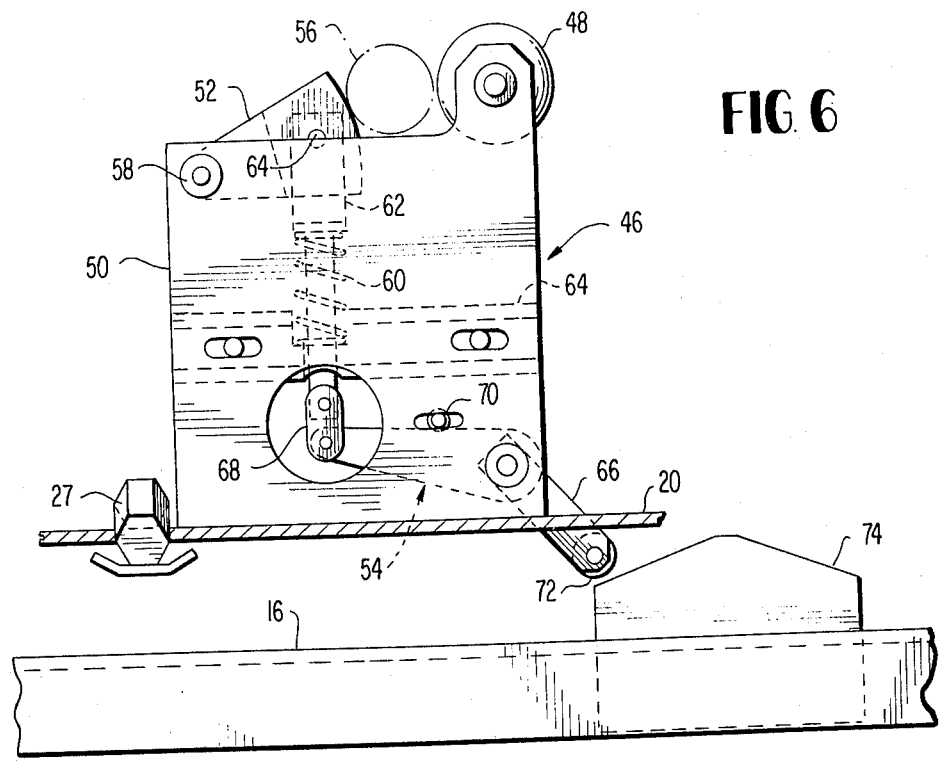
FIG. 6 is an enlarged view of a detail of FIG. 2.
Figure 8:
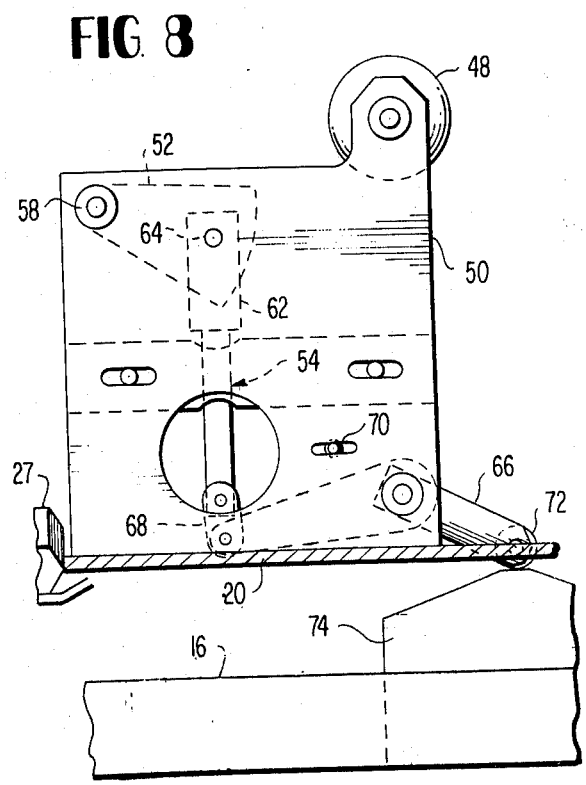
FIG. 8 is a side view of the mechanism shown in FIGS. 6 and 7.
Figure 7:
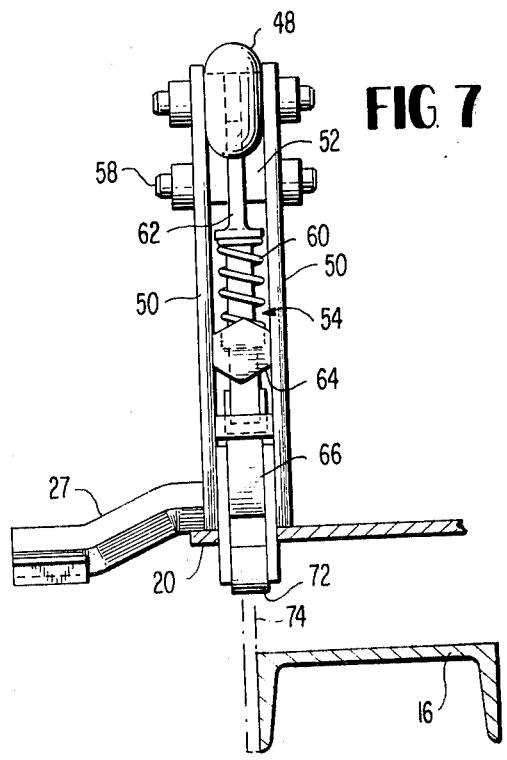
FIG. 7 is similar to FIG. 6 except that it shows the retaining means in the contracted condition.

The dual-action fluid cylinder 28 is actuated by any appropriate means, and may, for instance, be controlled by the contact of an appropriate sensing means (not shown) on the cars with a cam track such as cam track 27 shown in FIGS. 6-8, followed by the sending of an appropriate control signal to the cylinder. Since such apparatus forms no part of the present invention, it is not described farther herein. Whatever means is used should ordinarily, however, be designed to return the dual-action fluid cylinder 28 to a normal position after each operation, since the turning capability of the car turners 10 in a single direction is limited by the length of the cylinder's rod. This stricture would not apply, however, if the system parameters were such that the car turner 10 were used alternately in opposite directions.

Figure 4:
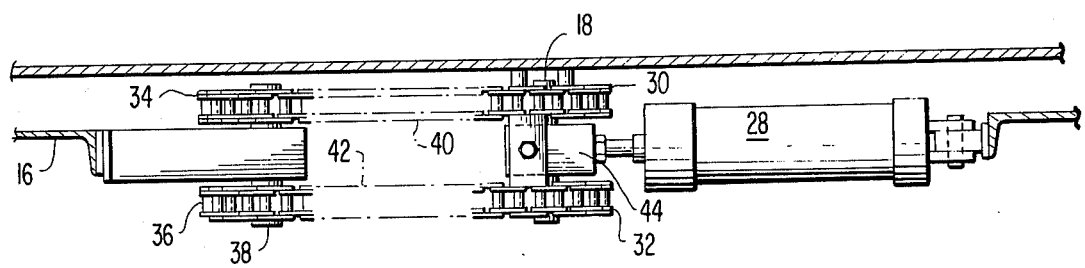
FIG. 4 is a sectional view taken along the lines 4—4 in FIG. 3.

The turntable 20 is driven in rotations by means of a dual-action fluid cylinder 28 mounted on the stationary frame 16. The linear motion of the rod of the dual-action fluid cylinder 28 is changed to rotational motion and transmitted to the turntable 20 by means of a system of sprockets and chains. In the preferred embodiment, this system of sprockets and chains (which is best seen in FIG. 4) comprises sprockets 30 and 32 integrally mounted on the rotatable pivot shaft 18, sprockets 34 and 36 rotatably mounted on a stub axle 38, which is in turn mounted on the stationary frame 16, chains 40 and 42, which pass around the sprocket pairs 30,34 and 32,36 respectively, and a drive transmission block 44. The drive transmission block 44 is carried between the chains 40 and 42, permitting the linear motion of the rod of the dual-action fluid cylinder 28 to be transmitted simultaneously through both chains to the rotatable pivot shaft 18. The sprocket pair 34,36 must be co-axial, though both sprockets need not be mounted on a single shaft, the sprocket pairs 34,36 and 30,32 must be the same distance apart, and the sprocket pairs 34,36 and 30,32 must have the same pitch diameter. The sprocket pairs 30,34 and 32,36 need not have the same pitch diameter, though they do in the preferred embodiment. While the preferred embodiment employs two pairs of sprockets and a double chain to distribute the power transmitted by the rod of the dual-action fluid cylinder 28, it should be recognized that a single chain and a single pair of sprockets can be substituted for the construction shown at some gain in simplicity but some loss in reliability. In such a construction, the drive transmission block would, of course, be mounted on the single chain.

Means for releasably retaining a car on the turntable 20 during rotary motion are preferably provided, since the car will be subjected to an unbalanced centrifugal force tending to cause it to move off the turntable 20 during rotary motion unless the center of gravity of the car happens to be directly over the rotatable pivot shaft 18. One such means, indicated by the number 46, is illustrated generally in FIGS. 1 and 2 and in detail in FIGS. 6–8. It comprises an elastic stop 48 mounted between two vertical mounting plates 50 fixedly connected to the turntable 20, a pivoting latch means 52, and a linkage control means designated generally by the number 54 for controlling the movement of the pivoting latch means 52.

As a car (not shown) comes on to the car turner from the left in FIGS. 6 and 7, a dependage 56 (shown in phantom in FIG. 6 only) forces the pivoting latch means 52 to pivot clockwise about its axis 58. After passing over the pivoting latch means 52, the dependage 56 strikes against the elastic stop 48, but the car is prevented from rebounding appreciably because the pivoting latch means 52 will have returned to its original position under the influence of a biasing spring 60 before the car has had time to change direction.

The biasing spring 60 is coaxial with a vertical linkage member 62 which is pivotably attached to the pivoting latch means 52 about an axis 64. The vertical linkage member 62 passes through an oversized hole in a horizontal biasing element 64 fixedly mounted between the vertical mounting plates 50, the point of the hole's being oversized being to permit the vertical linkage member 62 to cock slightly to compensate for the rotary motion of the axis 64 about the axis 58.

The lower end of the vertical linkage member 62 is connected to one end of a bellcrank lever 66 by means of a linkage member 68. As shown, the bellcrank lever 66 is fabricated from two separate lever arms connected to each other in fixed angular relationship by any appropriate means; however, it could obviously be fabricated as one part. The linkage member 68 is provided to compensate for the difference in the circular motion of the adjacent arm of the bellcrank lever 66 and the generally vertical motion of the vertical linkage member 62, but its office could obviously be filled by various other well known devices, such as a lost-motion slot in either the bellcrank lever 66 or the vertical linkage member 62 or by making the hole in the horizontal bracing element 64 still larger.

The clockwise motion of the bellcrank lever 66 is limited by an internal stop 70, as shown in FIG. 6. Access is provided to both the linkage member 68 and the internal stop 70 by means of holes in the vertical mounting plates 50, thereby permitting repair of the linkage control means 54 while the vertical mounting plates 50 remain in place.

Finally, a cam roller 72 is provided on the end of the bellcrank lever 66 remote from the vertical linkage member 62, and the cam roller 72 cooperates with a cam 74 located at an appropriate point in the path of the pivoting car turner to actuate the linkage control means 54 to pull the pivoting latch means 52 to the position shown in FIG. 7, thereby releasing the dependage 56 and allowing the car to procede in the direction opposite to that in which it arrived on the car turner. (It should be noted that the cam 74 is shown rotated out of its actual position in FIGS. 6–8 for ease of illustration and ready comprehension.)

As previously mentioned, the illustrated embodiment is designed to rotate a car through 180°, thereby completely reversing its direction. In this embodiment, the length of the stroke of the rod of the dual-action fluid cylinder 28 must be equal or very nearly equal to one half the circumference of the pitch circle of the sprocket pair 30,32. If the car turner is modified to rotate a car through some other angle (for instance, 90°), the relationship between the stroke length and the fraction of the circumference of the sprocket must be modified accordingly. If a dual-action fluid cylinder which is capable of stroke-length adjustment on a use-by-use basis is used, the car turner can be readily modified to permit selection of various degrees of rotation — for instance, a rotation by 180° in the case of one car and a rotation by 90° in the case of the next successive car.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. A car turner for the cars of a unit transportation system, said car turner comprising:
   1. a stationary frame;
   2. a rotatable pivot shaft mounted on said stationary frame;
   3. a turntable mounted on said rotatable pivot shaft;
   4. a first sprocket integrally mounted on said rotatable pivot shaft;
   5. a second sprocket rotatably mounted on said stationary frame;
   6. a first chain passing around said first and second sprockets so that, when one rotates, the other will also rotate;
   7. a drive transmission block mounted on said first chain; and
   8. a dual-action fluid cylinder mounted on said stationary frame, the rod of said dual-action fluid cylinder being connected to said drive transmission block, whereby the linear motion of the rod of said dual-action fluid cylinder can be transmitted through said first chain and said rotatable pivot shaft to said turntable, causing said turntable to rotate back and forth.

2. A car turner as claimed in claim 1 and further comprising
   1. a third sprocket of the same pitch diameter as said first sprocket integrally mounted on said rotatable pivot shaft a given distance from said first sprocket;
   2. a fourth sprocket of the same pitch diameter as said second sprocket rotatably mounted on said stationary frame, said fourth sprocket being coaxial with said second sprocket and located the same distance from said second sprocket as said third sprocket is from said first sprocket; and
   3. a second chain passing around said third and fourth sprockets so that, when one rotates, the other will also rotate, and wherein said drive transmission block is mounted on said second chain as well as said first chain, being carried between them, whereby the linear motion of the rod of said dual-action fluid cylinder can be transmitted simultaneously through both said first and second chains to said rotatable pivot shaft and thence to said turntable, causing said turntable to rotate back and forth.

3. A car turner as claimed in claim 2 and further comprising a stub axle rotatably mounted on said stationary frame and wherein said second and fourth sprockets are mounted on said stub axle.

4. A car turner as claimed in claim 2 wherein said first, second, third, and fourth sprockets are all of the same pitch diameter.

5. A car turner as claimed in claim 1 wherein said first and second sprockets are of the same pitch diameter.

6. A car turner as claimed in claim 1 and further comprising means for releasably retaining a car to be turned on said turntable while said turntable is being rotated.

7. A car turner as claimed in claim 6 wherein said means for releasably retaining a car to be turned on said turntable while said turntable is being rotated comprises:
   1. a stop mounted on said turntable;
   2. a latch means movably mounted on said turntable at a distance from said stop, said latch means being positioned to be moved out of the way by a car coming on to said turntable when said turntable is in a first position;
   3. means for biasing said latch means into the path of a car coming on to said turntable; and
   4. control means for moving said latch means out of the path of a car leaving said turntable when said turntable is in a second position, whereby a portion of a car will be caught between said stop and said latch means when it comes onto the turntable at a first postion thereof, the car will be held between said stop and said latch means while the turntable is rotated, and said latch means will be moved out of the way, permitting the car to leave the turntable, when the turntable has rotated to a second position thereof.

8. A car turner as claimed in claim 7 wherein said control means comprises:
   1. a linkage member connected at a first end to said latch means;
   2. a bellcrank lever pivotably mounted on said turntable, one end of said bellcrank lever being connected to the second end of said linkage member and the other end of said bellcrank lever being a cam follower; and
   3. a cam mounted externally to said turntable, whereby said cam can cause said bellcrank lever to pivot, thereby moving said linkage member and causing said latch means to move out of the path of a car leaving said turntable.

9. A device for releasably retaining a car on a turntable while the turntable is being rotated, said means comprising:
   1. a stop mounted on said turntable;
   2. a latch means movably mounted on said turntable at a distance from said stop, said latch means being positioned to be moved out of the way by a car coming on to said turntable when said turntable is in a fixed position;
   3. means for biasing said latch means into the path of a car coming on to said turntable; and
   4. control means for moving said latch means out of the path of a car leaving said turntable when said turntable is in a second position, whereby a portion of a car will be caught between said stop and said latch means when it comes onto the turntable at a first position thereof, the car will be held between said stop and said latch means while the turntable is rotated, and said latch means will be moved out of the way, permitting the car to leave the turntable, when the turntable has rotated to a second position thereof.

10. A device as claimed in claim 9 wherein said control means comprises:
    1. a linkage member connected at a first end to said latch means;
    2. a bellcrank lever pivotably mounted on said turntable, one end of said bellcrank lever being connected to the second end of said linkage member and the other end of said bellcrank lever being a cam follower; and
    3. a cam mounted externally to said turntable, whereby said cam can cause said bellcrank lever to pivot, thereby moving said linkage member and causing said latch means to move out of the path of a car leaving said turntable.

* * * * *